(No Model.) 2 Sheets—Sheet 1.
A. G. WILKINS.
APPARATUS FOR SECURING BUTTONS TO FABRICS.
No. 297,895. Patented Apr. 29, 1884.
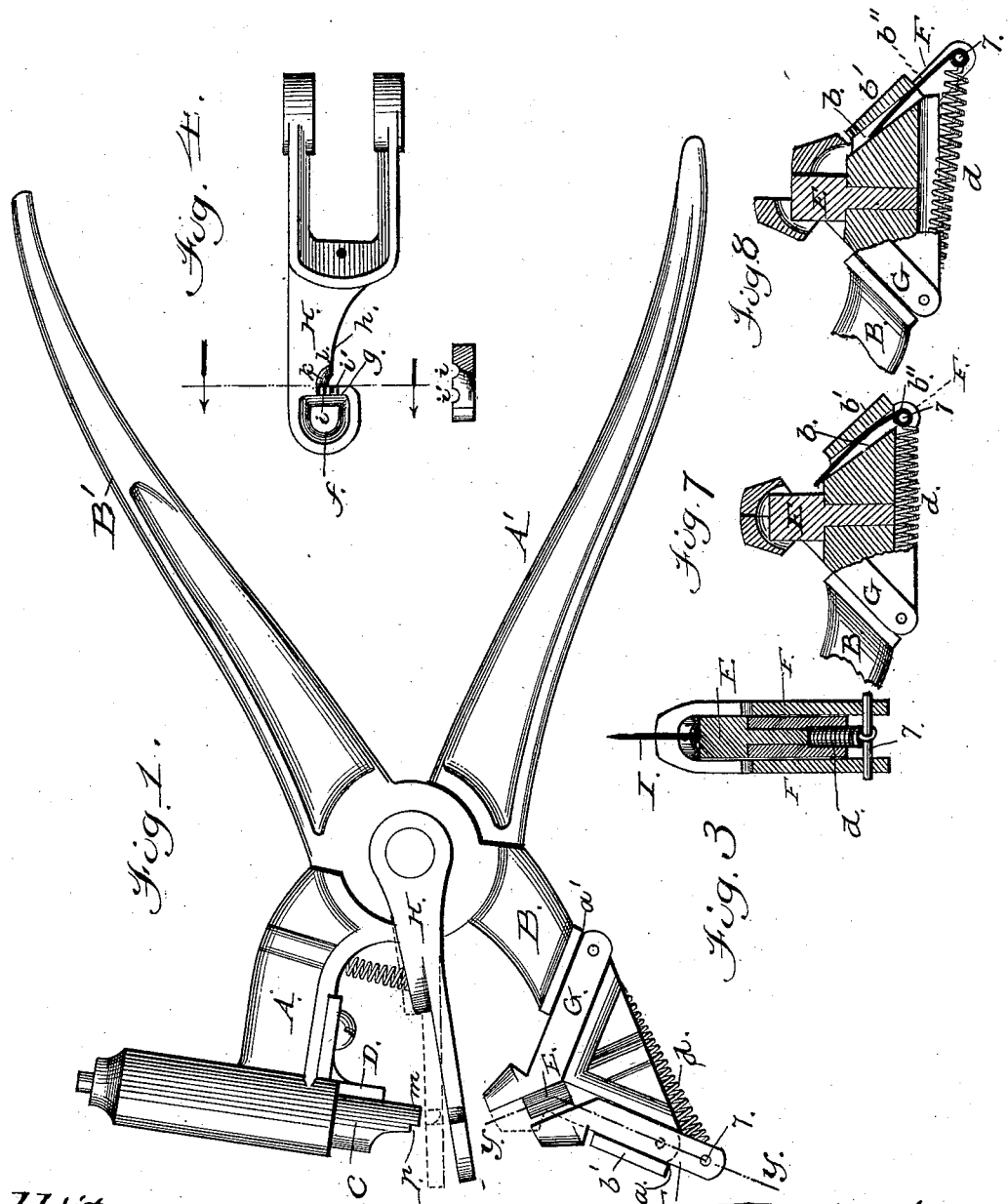
Witnesses:
T. Walter Fowler,
E. Wenzel
Inventor:
A. G. Wilkins
by R. K. Evans
his attorney (No Model.) 2 Sheets—Sheet 2.
A. G. WILKINS.
APPARATUS FOR SECURING BUTTONS TO FABRICS.
No. 297,895. Patented Apr. 29, 1884.
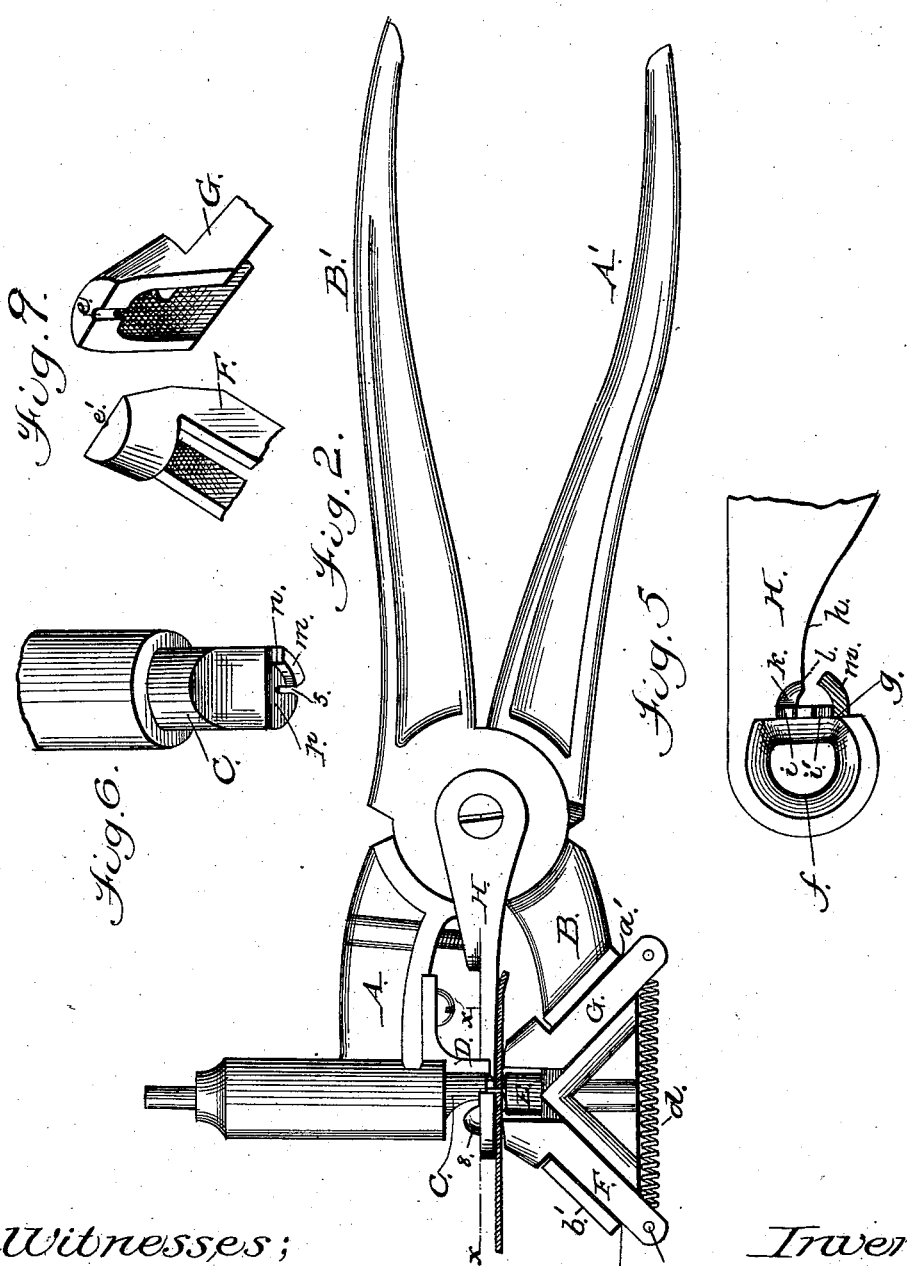
Witnesses:
J. Walter Fowler,
E. Wenzel
Inventor:
A. G. Wilkins
by R. K. Evans
his atty.

UNITED STATES PATENT OFFICE.

ALEXANDER G. WILKINS, OF MEADVILLE, PENNSYLVANIA, ASSIGNOR TO THE WILKINS SHOE-BUTTON FASTENER COMPANY, OF SAME PLACE.

APPARATUS FOR SECURING BUTTONS TO FABRICS.

SPECIFICATION forming part of Letters Patent No. 297,895, dated April 29, 1884.

Application filed February 7, 1884. (No model.)

*To all whom it may concern:*

Be it known that I, ALEXANDER G. WILKINS, of Meadville, in the county of Crawford, State of Pennsylvania, have invented certain Improvements in Apparatus for Securing Buttons to Shoes and other Fabrics; and I hereby declare the following to be a full, clear, and exact description thereof, reference being had to the accompanying drawings, making part of this specification, in which—

Figure 1 is a side elevation of the machine, the parts being in position to insert the button and the button-fastener, as shown in solid lines, and shown in dotted lines returned to the position for fastening. Fig. 2 is a side elevation of the machine with a button-fastener clinched. Fig. 3 is a vertical sectional view on the line *y y* of Fig. 1. Fig. 4 is a plan view and cross-sectional view of the button-holding spring-plate. Fig. 5 is a horizontal sectinal view on the line *x x* of Fig. 2, showing the spring-plate, the projection on the lower end of plunger, and button-eye in position. Fig. 6 is a perspective view of the lower end of the spring-plunger. Figs. 7 and 8 are vertical sections, illustrating the detent for retaining the fastener-holding device. Fig. 9 illustrates on an enlarged scale the heads of the fastener-holding jaws.

My invention relates to apparatus for securing button-fasteners, and is an improvement on the apparatus shown and described in Letters Patent No. 284,159, issued August 28, 1883.

My invention consists in sundry details of construction, as will be hereinafter fully described, and specifically pointed out in the claims, whereby, first, the jaws of the fastener-holder are held apart while a fastener is inserted; second, the centering mechanism positively centers and holds the fastener; third, the button-holder is adapted for use with varying sizes of buttons and varying sizes of button-eyes; fourth, the wire of the button-eye is rigidly held and performs the office of a mandrel around which to bend the fastening-pin; fifth, the button-eye brings up against a stop on the spring-plunger, so that it can only project from the button-holder a determinate distance; and, sixth, the button can be readily withdrawn when the fastening is complete.

In order that those skilled in the art may make and use my invention, I will proceed to describe the manner in which I have carried it out.

In the said drawings, A and B are the working-jaws of the machine, operated in the usual manner by the levers A' and B'. The upper jaw is provided with a slotted sliding bolt, C, and upsetting-tool D, as shown in the patent of August 28, 1883, referred to. The lower jaw, B, is provided with the anvil E and sliding spring centering-jaws F G, and between the jaws is a spring-plate, H, to hold the button, all of which are shown in the patent hereinbefore mentioned. The jaws of the spring fastener-holder reciprocate in diagonal ways *a a'*, and are normally held closed by means of the coiled spring *d*, which connects the lower ends of the jaws.

The front jaw, F, of the fastener-holder is provided with means, as follows, to keep it temporarily depressed when forced down, so that the operator is enabled to readily place a fastener in position.

Through the lower jaw, B, and between the ribs *b'*, in which the front jaw, F, of the fastener-holder slides, I bore a hole, *b*, which is at an angle of greater pitch than the pitch of the groove *a*. In this hole *b* rests a spring detent rod or wire, *b''*, which moves back and forth with the fastener-holder jaw F, by means of its end being bent or otherwise secured to pin 7, which also holds one end of spring *d*. When the fastener-holding jaws are closed to seize a fastener-pin, the spring-wire *b''* has its pivoted end close to the hole or opening *b*, and the wire has no bearing against the sides of said hole, (see Figs. 7 and 8;) but when the head of the jaw F has reached its lowest point of travel the relation of the rod or wire *b''* will have so changed with reference to hole *b* that the wire *b''* will bind against the side of hole *b* sufficiently to act as a detent to the jaw F, and retain it at its lowest point until a fastener is inserted, (see Fig. 8,) whereupon a pressure of the finger upon the lower end of the fastener-holder jaw F overcomes the binding of the rod *b''* and throws the binding-jaws together. The rear holding-jaw, G, has its head made quite heavy, so as to have the length of contact with the pin I as great as possible, and has cut in its vertical face a groove, e, just deep enough to receive the pin slightly beyond its longitudinal center. The vertical face of the fastener-holder jaw F has a very slight groove, e', in its surface, so that when the two grooves e e' come together and against the pin I the jaws hold and center the said pin by a positive bite or pinch on it, and thereby insure a greater certainty of position to the pin. The button-receiving end of the spring-plate H is provided with an enlarged depression, f, having the bottom cut through, as shown, so as to accommodate even the largest sizes of buttons, and terminates in comparatively a sharp edge, g, which rests against the forward edge of the lower end of the spring-bolt C.

In the edge g of plate H are two semicircular depressions, i i', of a depth less than the diameter of the button-eye wire, in which rests the wire of the button-eye when the button is in place. The plate H is cut away at one side on the line h, (see Fig. 4,) to allow the removal of the button with facility from the fastening-point. From the outer edge of the depression i the arm or plate H is cut or curved out, as seen at k, until the curved cut meets the line h at l. This curvature k has the general conformation of a quarter of the curve of the button-eye, and receives and holds that proportion of the button-eye wire.

On the lower end of the spring-bolt C is a projection, m, having its inner face, n, curved to correspond to the curvature of the button-eye, which lies against it when the button is in position to be fastened, and the said eye is clamped and steadied more securely thereby. The curved cut or recess k in plate H and the curved projection m lie on each side of and immediately below the slot 5 in the rear of bolt C, in which works the upsetting-tool D, and the projection m acts as a stop against which the button-eye brings up to keep the wire in proper relation to the slot 5 and upsetting-tool D.

It will be observed that where the end of bolt C registers against the plate H over the depressions i i' it has a flat surface, p, to bite or positively clamp the wire of the button-eye in said depressions.

The depressions i i', the curved cut or recess k in plate H, and the curved projection m and straight face on bolt C form clamping-surfaces for the button-eye, which hold said eye rigidly in the fastening operation and require the wire of the button-eye to act as a mandrel around which the wire of the fastener-pin is sustained while it is being bent by the upsetting-tool.

As the depression f in plate H is made sufficiently large to accommodate the body of any sized button, and as the button is held to the fastening-point by the bite upon the button-eye alone, it is evident that this machine may be used for attaching any of the standard sizes of buttons, as the eye strikes the curved stop m, which acts to prevent it from passing beyond the required distance into the machine. The slot 5 in bolt C passes out or ends in the working-face or flat surface p, and the eye does not to any degree rest below that face. This construction enables the button to be readily removed from the plate H as soon as it is depressed after the fastening is complete. The loop of the fastener drops down through the open end of slot 5, is free from the plunger or bolt C, and is lifted from plate H.

Having thus described my invention, what I claim as new, and desire to secure by Letters Patent, is—

1. In a machine for securing button-fasteners, a spring holding and centering device, in combination with a detent-catch to hold the jaws apart while a fastener is being inserted.

2. In a machine for securing button-fasteners, the jaw B, provided with diverging ways in which slide jaws F G, and the hole b of greater pitch than said ways, in combination with the binding rod or wire b'', secured to jaw F, all constructed, arranged, and operated as set forth.

3. In a machine for securing button-fasteners, the spring-jaws F G, provided on their faces with the vertical grooves e e', of a combined depth less than the diameter of the fastener-shank I, for the purpose described.

4. In a machine for securing button-fasteners, the spring button-holding plate H, provided with the curved recess k, and having its bottom and side conforming to the dimension and shape of a portion of the button-eye, as and for the purpose described.

5. In a machine for securing button-fasteners, the spring-bolt C, provided on its lower end with a stop integral with said bolt for the button-eye to bring up against, as set forth.

6. In a machine for securing button-fasteners, the bolt C, provided with a projection, m, having its inner surface, n, curved to conform to the curvature of a portion of the button-eye, substantially as described.

7. In a machine for securing button-fasteners, the bolt C, provided with the flat face p, and the projection m, having the inner curved face, n, in combination with the button-holding plate H, having the depression f, depressions i i', and curved recess k, for clamping and securing the button-eye, to act as a mandrel to resist the fastener-shank during the clinching, as described.

8. In a machine for securing button-fasteners, the spring-bolt C, having the flat face p, and provided with the slot 5, opening through its end, and the stop or projection m, in combination with plate H, cut away at h, and having the depressions i i', and the curved recess k, whereby the button is readily removed from the fastening-point, all constructed, arranged, and operated as set forth.

ALEXANDER G. WILKINS.

Witnesses:
GEO. W. ADAMS,
SAML. S. PORTER.